United States Patent
Lee et al.

(10) Patent No.: US 8,055,889 B2
(45) Date of Patent: Nov. 8, 2011

(54) BIOS MANAGEMENT DEVICE AND METHOD FOR MANAGING BIOS SETTING VALUE

(75) Inventors: Yu-Chen Lee, Taipei (TW);
Chieh-Shien Lin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 832 days.

(21) Appl. No.: 12/113,956

(22) Filed: May 2, 2008

(65) Prior Publication Data
US 2008/0215868 A1    Sep. 4, 2008

(30) Foreign Application Priority Data
May 11, 2007    (TW) ................................ 96116828 A

(51) Int. Cl.
*G06F 15/177*    (2006.01)
*G06F 9/00*    (2006.01)
*G06F 1/24*    (2006.01)
(52) U.S. Cl. ................. 713/1; 713/2; 713/100
(58) Field of Classification Search .......... 713/1
See application file for complete search history.

(56) References Cited

U.S. PATENT DOCUMENTS

| 6,253,319 | B1 * | 6/2001 | Tran et al. ................... 713/1 |
| 6,647,512 | B1 | 11/2003 | James et al. |
| 7,003,655 | B2 * | 2/2006 | Wang et al. ................ 713/1 |
| 7,069,472 | B2 * | 6/2006 | James et al. ................ 714/36 |
| 7,577,829 | B2 * | 8/2009 | Dennis ........................ 713/1 |
| 2002/0162052 | A1 * | 10/2002 | Lewis ........................... 714/36 |
| 2004/0073842 | A1 | 4/2004 | James et al. |
| 2006/0020844 | A1 * | 1/2006 | Gibbons et al. ........... 714/2 |

FOREIGN PATENT DOCUMENTS

| CN | 1707442 | 12/2005 |
| TW | I269202 | 12/2006 |
| TW | 200707291 | 2/2007 |

* cited by examiner

*Primary Examiner* — Suresh Suryawanshi
(74) *Attorney, Agent, or Firm* — Jianq Chyun IP Office

(57) ABSTRACT

The invention provides a BIOS management device and a method for managing a BIOS setting value. The invention determines whether to shut down a computer and to restore the BIOS setting value to a default state by detecting whether a restoring event occurs. In addition, the computer is shut down and the BIOS setting value is restored to the default state when the restoring event occurs. Therefore, the fault caused by the improper setting of the BIOS is eliminated.

16 Claims, 2 Drawing Sheets

BIOS MANAGEMENT DEVICE AND METHOD FOR MANAGING BIOS SETTING VALUE

CROSS-REFERENCE TO RELATED APPLICATION

This application claims the priority benefit of Taiwan application serial no. 96116828, filed on May 11, 2007. The entirety of the above-mentioned patent application is hereby incorporated by reference herein and made a part of specification.

BACKGROUND OF THE INVENTION

1. Field of the Invention

The invention relates to a management technology for a basic input output system (BIOS) and, more particularly, to a BIOS management device and method for managing a BIOS setting value.

2. Description of the Related Art

Along with the popularity of the self-assembly computer technology, a user often makes a computer have preferred performance by the overclock technology. The common method is that the operating frequency of the computer is controlled by setting the BIOS of the computer. Generally speaking, the BIOS of the computer can be set only when the computer is in a normal working state. If the BIOS is improperly set, the computer not only can be caused to crash, but also even cannot be booted after the computer is shut down, and therefore, the user cannot restore the BIOS by the common method of setting the BIOS.

The improper setting of the BIOS can cause the crash of the computer, and along with the increase of crash time, interior components of the computer are possible to be further badly damaged. The conventional method is that the user needs to press the power button of the computer for four seconds to shut down the computer. Next, the user needs to open the housing of the computer. Finally, the user makes a jumper electrically connected to a specific pin in the front panel area of the motherboard to clear (or restore) BIOS setting values in the BIOS. The actions are usually called actions of clearing the setting values of a complementary metal oxide semiconductor (COMS) (Clear CMOS). Persons having ordinary skill in the art should know that steps of clearing the BIOS setting values in the BIOS are very complicated, and the jumper is very small and is often lost.

BRIEF SUMMARY OF THE INVENTION

The invention provides a BIOS management device, and the BIOS management device is used for shutting down a computer and restoring a BIOS setting value of the BIOS, thereby increasing the convenience.

The invention provides a method for managing a BIOS setting value to eliminate the fault caused by the improper setting of the BIOS.

The invention provides a BIOS management device installed on a computer. The BIOS management device includes a BIOS, a switch and a chipset. The BIOS has a BIOS setting value. The switch is exposed outside the computer and is used for generating a voltage signal, and the generating of level of the voltage signal is based on the state of the switch. The chipset is coupled to the switch and the BIOS. The chipset determines whether to shut down the computer and to restore the BIOS setting value to a default state based on the level of the voltage signal.

The invention provides a method for managing a BIOS setting value, which is applied to a computer. The method includes the step of detecting whether a restoring event occurs to determine whether to shut down the computer and to restore the BIOS setting value to a default state. When the restoring event occurs, the computer is shut down and the BIOS setting value is restored to the default state.

The invention provides a method for managing a BIOS setting value, which is applied to a computer. The method includes the step of detecting whether a restoring event occurs and whether a preventing error touch function is enabled. When the preventing error touch function is enabled and the restoring event occurs, whether to shut down the computer and to restore the BIOS setting value to a default state is determined based on the operation state of the computer.

In the invention, whether to shut down a computer and to restore a BIOS setting value to a default state is determined by detecting whether a restoring event occurs. When the restoring event occurs, the computer is shut down and the BIOS setting value is restored to the default state, so that the fault caused by the improper setting of the BIOS is eliminated.

These and other features, aspects, and advantages of the present invention will become better understood with regard to the following description, appended claims, and accompanying drawings.

DETAILED DESCRIPTION OF THE EMBODIMENTS

Figure 1:
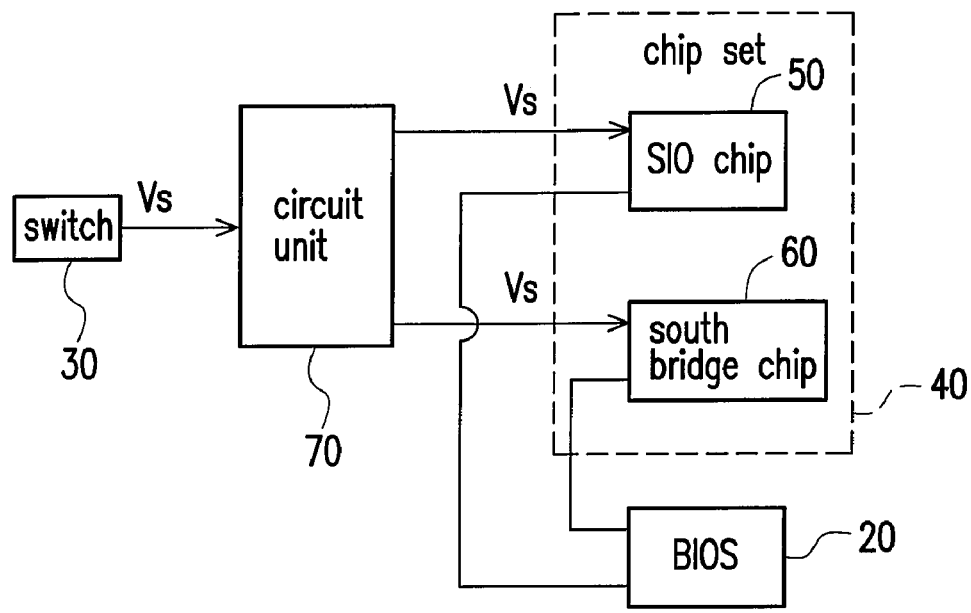
FIG. 1 is a schematic diagram showing a BIOS management device according to the first embodiment of the invention.

FIG. 1 is a schematic diagram showing a BIOS management device according to the first embodiment of the invention. Please refer to FIG. 1, and the BIOS management device 10 is installed on a computer. In the embodiment, the BIOS management device 10 includes a BIOS 20, a switch 30 and a chipset 40. In the embodiment, the switch 30 is exposed outside the computer and is coupled to the chipset 40 to transmit a voltage signal Vs to the chipset 40.

The chipset 40 is also coupled to the BIOS 20. Generally speaking, the BIOS setting value is loaded to a COMS RAM from the BIOS 20, such as a nonvolatile random access memory (NVRAM) storing BIOS code, and the CMOS RAM can store BIOS setting values needed in the operation of the computer.

The BIOS management device 10 can include a circuit unit 70. The circuit unit 70 is coupled between the switch 30 and the chipset 40, and is used for transmitting the voltage signal Vs of the switch 30 to the chipset 40.

In a plurality of embodiments, the switch 30 can be a button or a slide switch. In the embodiment, the switch 30 is a button, but persons having ordinary skill in the art can know that it is not limited in the invention.

In the embodiment, the level of the voltage signal Vs is based on the state of the switch 30. For example, if the switch 30 is a button, and when the switch 30 is pressed, the level of the voltage signal Vs may be a first level such as a high level. When the switch 30 is released, the level of the voltage signal Vs may be a second level such as a low level.

Please go on referring to FIG. 1, and the chipset 40 may include a super input output (SIO for short) chip 50 and a south bridge chip 60 both of which are coupled to the BIOS 20 and the switch 30 to receive the voltage signal Vs.

The SIO chip 50 determines whether to shut down the computer based on the level of the voltage signal Vs, and the south bridge chip 60 determines whether to restore a BIOS setting value to a default state based on the level of the voltage signal Vs.

Persons having ordinary skill in the art should know that the action of restoring the BIOS setting value to the default state is, for example, a so-called action of clearing the setting value of the CMOS (Clear CMOS). In other words, when the fault of the computer is caused by the improper setting of the BIOS, the user can make setting of various terms in the BIOS restored to a normal default state by pressing the switch 30.

In the embodiment, the BIOS can obtain the computer state, such as the operating system state so that the SIO chip 50 can determine whether to shut down the computer based on the level of the voltage signal Vs and the computer state.

For example, when the computer works under a DOS operating system state obtained by the BIOS, the SIO chip 50 determines whether to shut down the computer based on the level of the voltage signal Vs. When the computer does not work under the DOS operating system state, the SIO chip 50 does not do actions.

The south bridge chip 60 can also determine whether to restore the BIOS setting value to the default state based on the level of the voltage signal Vs and the computer state. For example, when the computer works under the DOS operating system state or is in a shutdown state, the south bridge chip 60 determines whether to restore the BIOS setting value to the default state based on the level of the voltage signal Vs. When the computer does not work under the DOS operating system state or is not in the shutdown state, the south bridge chip 60 does not do actions. Each step of the method for managing the BIOS setting value is illustrated in detail hereinbelow.

Figure 2:
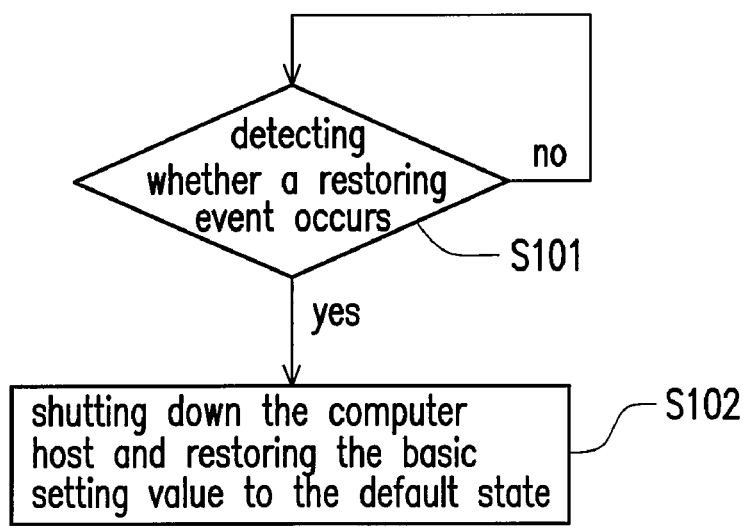
FIG. 2 is a flow chart showing a method for managing a BIOS setting value according to the first embodiment of the invention.

FIG. 2 is a flow chart showing a method for managing a BIOS setting value based on the first embodiment of the invention. Please refer to FIG. 1 and FIG. 2 simultaneously, and first, in the step S101, the chipset 40 detects whether a restoring event occurs. In this embodiment, the restoring event occurs can be determined by, for example, detecting whether the switch 30 is pressed to make the level of the voltage signal Vs changed.

In further details, when a computer crash is caused by the improper setting of the BIOS 20, the user can press the switch 30 to change the level of the voltage signal Vs outputting to the chipset 40. When the level of the voltage signal Vs is a first level, it denotes that the restoring event occurs; on the contrary, when the level of the voltage signal Vs is not the first level or is the second level, it denotes that the restoring event does not occur.

When the restoring event does not occur, the computer continuously normally works, and the method returns to the step S101. On the contrary, when the restoring event occurs, the computer is immediately shut down via the SIO chip 50 and the "Clear CMOS" is done and the BIOS setting value is restored to the default state via the south bridge chip 60 (step S102).

In the above embodiment, the advantage of restoring the BIOS setting value to the default state is that the fault of the computer caused by the improper setting of the BIOS 20 can be eliminated. In addition, the action of shutting down the computer immediately not only can avoid the damage of the hardware but also can make the temporary data of the computer released, thereby solving the crash problem.

For example, when the user does an overclock action for the central processing unit (CPU) of the computer, if the clock of the CPU is set to be too high, not only the crash of the computer can be caused, but also the CPU may be damaged. At this time, the user only needs to press the switch 30, and then the computer can be shut down immediately and the "Clear CMOS" is done and the BIOS setting value is restored to the default state, which is very convenient for the user.

When the computer is shut down, the power supply of the computer still continuously supplies a standby voltage to the computer. Therefore, in another embodiment, when the computer is shut down, the power supply can also temporarily stop supplying the standby power to the computer to clear the temporary data of the computer thoroughly.

In the embodiment, the switch 30 provided at the input output (IO for short) area of the motherboard of the computer. In this way, the user can make the computer shut down and make the BIOS setting value restored to the default state without opening the housing of the computer.

Although in the above embodiment, a possible mode of the method for managing a BIOS setting value is described, persons having ordinary skill in the art should know that every manufacturer designs different steps for the method for managing a BIOS setting value, and therefore, the application of the invention is not limited by the possible mode. In other words, as long as a method determines whether to shut down a computer and to restore a BIOS setting value to a default state based on whether a restoring event occurs, the method is within the scope of the invention. Other embodiments are described hereinbelow to make persons having ordinary skill in the art to further understand the spirit of the invention and carry out the invention.

Figure 3:
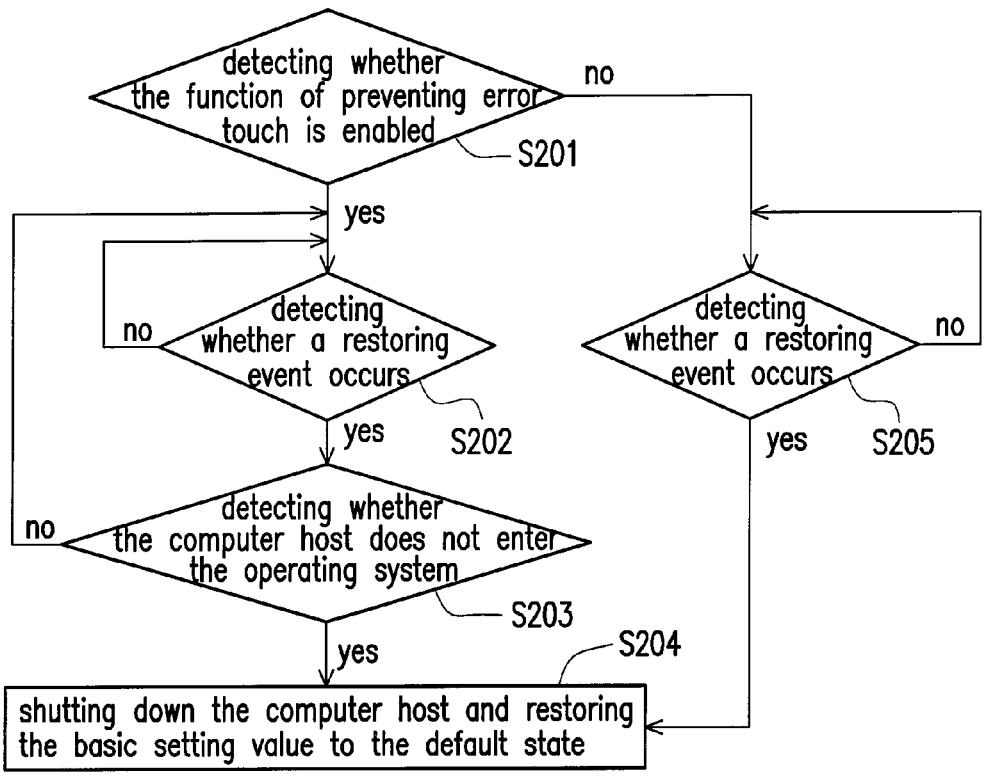
FIG. 3 is a flow chart showing a method for managing a BIOS setting value according to the second embodiment of the invention.

FIG. 3 is a flow chart showing a method for managing a BIOS setting value based on the second embodiment of the invention. Please refer to FIG. 1 and FIG. 3 simultaneously, and first, in the step S201, the chipset 40 detects whether a preventing error touch function of the BIOS 20 is enabled. If preventing error touch function of the BIOS 20 is enabled, the chipset 40 detects whether a restoring event occurs (step S202), and please refer to the above embodiment about the content of the restoring event, and it is not described for concise purpose.

In the step S202, when the restoring event does not occur, the computer continuously normally works, and the method returns to the step S202; otherwise, the BIOS 20 detects whether the computer does not enter an operating system (step S203). In the step S203, if the computer does not enter the operating system, the method returns to the step S202; otherwise, the SIO chip 50 shuts down the computer immediately, and the south bridge chip 60 restores the BIOS setting value to the default state (step S204).

From the above, in the step S201, if the preventing error touch function of the BIOS 20 is disabled, the chipset 40 detects whether a restoring event occurs (step S205). In the step S205, when the restoring event does not occur, the computer continuously normally works and the method returns to the step S205; otherwise, the method jumps to the step S204. In this way, the enabled preventing error touch function of the BIOS 20 can avoid the unforeseen error of the computer caused by improperly touching the switch 30 after the computer enters the operating system.

In the above embodiment, the state that the computer does not enter the operating system is, for example, S5 or G3; the state that the computer enters the operating system is, for example, S0, S1, S3 or S4. Persons having ordinary skill in the art should know that in the advanced configuration and power management interface (ACPI for short) standard, sleep states with different degrees of a computer are defined. For example, S1 denotes a power on suspend state, that is, the power supply still supplies a main power to the computer and just the operating system enters a suspending state.

From the above, S3 denotes a suspend to random access memory (RAM) (STR for short) state, that is, when the operating system is suspended, the data of the operating system and the related context of each device are stored to a RAM, and then the main power of the power supply is turned off, and only a standby power is supplied to the RAM and the related circuits to store the data in the RAM. S4 denotes a suspend to disk (STD for short) state, that is, when the operating system is suspended, the system data and the related context of each device are stored to a hard disk, and then the main power of the power supply is turned off, and the standby power does not need to be supplied to the related circuits, and the data cannot be lost. S5 and G3 denote current common soft off states.

Figure 4:
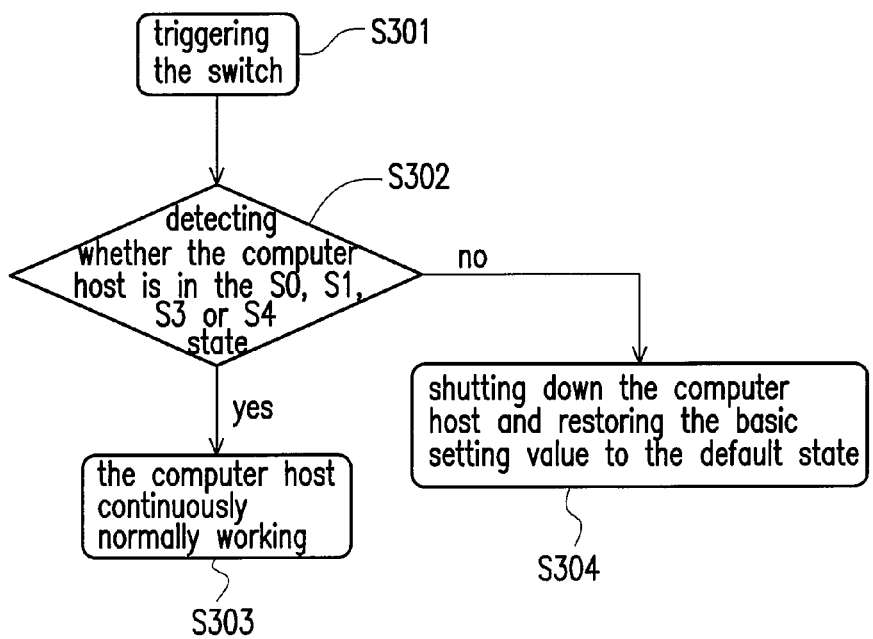
FIG. 4 is a flow chart showing a method for managing a BIOS setting value according to the third embodiment of the invention.

FIG. 4 is a flow chart showing a method for managing a BIOS based on the third embodiment of the invention. Please refer to FIG. 1 and FIG. 4 simultaneously, and the user can trigger the switch 30 (step S301) to eliminate the fault of the computer caused by the improper setting of the BIOS. And then in the step S302, whether the computer is in the S0, S1, S3 or S4 state is detected.

If the computer is in the S0, S1, S3 or S4 state, it is determined that the user improperly touches the switch 30, and then the method jumps to the step S303 to make the computer continuously normally work. In the step S302, if the computer is not in the S0, S1, S3 or S4 state, the method jumps to the step S304, so that the computer is shut down and the BIOS setting value is restored to the default state. In this way, the embodiment is simplified and can achieve the performance similar to the performance of the second embodiment.

To sum up, in the invention, a computer can be shut down and a BIOS setting value can be restored to a default state by detecting whether the level of a voltage signal Vs is a first level, thereby eliminating the fault of the computer. In addition, embodiments of the invention at least have the following advantages.

First, when the computer is shut down, a power supply also can temporarily stop supplying a standby power to the computer, thereby thoroughly clearing the temporary data of the computer.

Second, a switch is provided at the IO area of the motherboard, thereby increasing the operation convenience of the switch.

Third, the unforeseen error of the computer caused by improperly touching the switch after the computer enters the operating system can be avoided via the enabled preventing error touch function of the BIOS.

Fourth, when the switch is triggered, the unforeseen error of the computer caused by improperly touching the switch can be avoided by detecting the state of the computer.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A BIOS management device installed on a computer, wherein the computer includes a motherboard and a power button for turning on or turning off the computer, the BIOS management device comprising:
   a BIOS having a BIOS setting value;
   a restore bios switch disposed on the motherboard for exposing outside the computer and generating a voltage signal, wherein the level of the voltage signal is based on the state of the restore bios switch; and
   a chipset coupled to the restore bios switch and the BIOS, when a preventing error touch function is enabled, the chipset determines whether to shut down the computer and to restore the BIOS setting value to a default state based on the level of the voltage signal by the restore bios switch.

2. The BIOS management device according to claim 1, wherein the chipset comprises:
   a super input output (SIO) chip coupled to the switch and the BIOS and for determining whether to shut down the computer based on the level of the voltage signal; and
   a south bridge chip coupled to the switch and the BIOS and for determining whether to restore the BIOS setting value to the default state based on the level of the voltage signal.

3. The BIOS management device according to claim 2, wherein when the SIO chip shuts down the computer, the SIO chip disables a standby power used by the computer for clearing the temporary data of the computer.

4. The BIOS management device according to claim 1 further comprising:
   a circuit unit coupled between the switch and the chipset and for transmitting the voltage signal to the chipset.

5. The BIOS management device according to claim 1, wherein the chipset detects whether the preventing error touch function of the BIOS is enabled, and when the preventing error touch function is enabled, the BIOS detects the operation state of the computer.

6. The BIOS management device according to claim 5, wherein when the preventing error touch function is enabled, the chipset determines whether to shut down the computer and to restore the BIOS setting value to the default state based on the level of the voltage signal and the operation state of the computer.

7. The BIOS management device according to claim 6, wherein when the preventing error touch function is enabled, the computer does not enter an operating system, and the level of the voltage signal is a first level, the chipset shuts down the computer and restores the BIOS setting value to the default state.

8. A method for managing a BIOS setting value using in a computer, the method comprising the steps of:
   detecting whether a restoring event occurs and whether a preventing error touch function is enabled; and
   determining whether to shut down the computer and to restore the BIOS setting value to a default state based on the operation state of the computer when the preventing error touch function is enabled and the restoring event occurs.

9. The method according to claim 8, wherein the step of detecting whether the restoring event occurs comprises the steps of:
   receiving a voltage signal;
   determining that the restoring event occurs when the level of the voltage signal is a first level; and determining that the restoring event does not occur when the level of the voltage signal is a second level.

10. The method according to claim 8 further comprising the step of:
shutting down the computer and restoring the BIOS setting value to a default state when the preventing error touch function is disabled and the restoring event occurs.

11. The method according to claim 8, wherein the step of shutting down the computer comprises the step of:
stopping supplying a standby power to the computer to clear the temporary data of the computer.

12. The method according to claim 8, wherein the step of determining whether to shut down the computer and to restore the BIOS setting value to the default state based on the operation state of the computer comprises the step of:
shutting down the computer and restoring the BIOS setting value to the default state when the computer does not enter an operating system and the restoring event occurs.

13. The method according to claim 8, wherein the step of detecting whether the restoring event occurs comprises the steps of:
receiving a voltage signal; and
determining that the restoring event occurs when the level of the voltage signal is a first level and the computer enters an operating system.

14. The method according to claim 13, wherein the step of detecting whether the restoring event occurs further comprises the step of:
determining that the restoring event does not occur when the level of the voltage signal is a second level or the computer does not enter the operating system.

15. The method according to claim 8 further comprising the step of:
making the computer continuously normally work when the restoring event does not occur.

16. The method according to claim 8, wherein the step of shutting down the computer comprises the step of:
stopping supplying a standby power to the computer to clear the temporary data of the computer.

* * * * *